Nov. 15, 1927.

B. G. JOHNSON

SPRING REEL

Filed Aug. 4, 1923

Inventor:
Bernard G. Johnson.
By: George E. Mueller Atty.

Nov. 15, 1927.

B. G. JOHNSON 1,648,948

SPRING REEL

Filed Aug. 4, 1923

Five Gauge Wire

Inventor:
Bernard G. Johnson.
By

Patented Nov. 15, 1927.

1,648,948

UNITED STATES PATENT OFFICE.

BERNARD G. JOHNSON, OF BROOKFIELD, ILLINOIS, ASSIGNOR TO GRIGSBY-GRUNOW-HINDS CO., OF CHICAGO, ILLINOIS, A CORPORATION OF ILLINOIS.

SPRING REEL.

Application filed August 4, 1923. Serial No. 655,629.

The invention relates to spring reels, and is herein shown and described as applied to that class of these devices which are designed to have a conductor wound upon and from said reel to thereby allow the cord or conductor to be retracted or extended and permit a device such as a lamp or other member to be arranged at various locations when this is desired or found necessary.

It is one of the prime objects of the invention to employ a means for restoring or rewinding the cord upon the reel, which means will permit the use of a comparatively long cord and insure the rewinding of the cord or conductor upon the reel.

It is another object of the invention to employ a plurality of reel actuating elements which are connected in series with each other.

It is a further object to employ a plurality of reel actuating elements of a resilient or spring character, one of which contains a relatively larger number of turns than the other.

It is an additional object to arrange one spring element within the other so as to provide a compact structure capable of permitting the reel to be rotated sufficiently to allow a relatively long conductor to be unwound therefrom and rewound thereon.

It is a further feature of the invention to provide a construction capable of resulting in the above advantage which is simple in construction, compact, and is not liable to be rendered useless.

It is an added object of the invention to provide the reel with a means whereby the electrical connections between the conductor carried by the reel and conductors leading from and connected to the source of current may be made and maintained during the winding and unwinding of the cord.

In addition, it is an object to provide the reel with means for releasably locking it against rotation in any of its various positions.

The invention will be explained in detail and more readily understood when read in conjunction with the accompanying drawings, which disclose one arrangement whereby the invention may be accomplished, it being obvious, however, that changes and modifications may be resorted to without departing from the spirit of the appended claims forming a part hereof.

In the drawings,—

Figure 1:
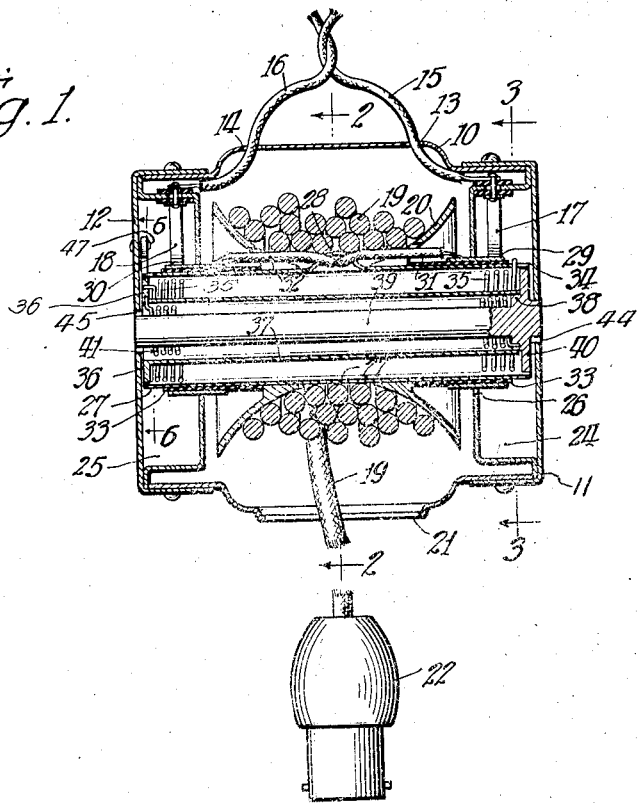
Fig. 1 is a central longitudinal section of a device embodying one form of the invention.
Figure 2:
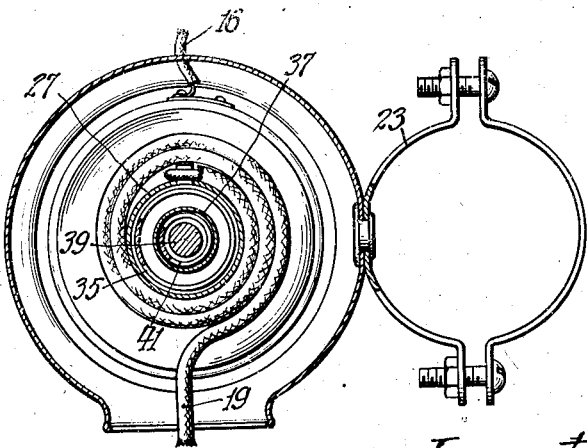
Fig. 2 is a section taken on line 2—2 of Fig. 1.
Figure 3:
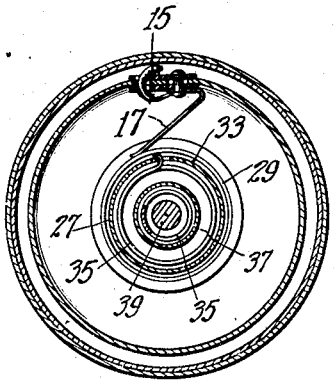
Fig. 3 is a section taken on line 3—3 of Fig. 1.
Figure 4:
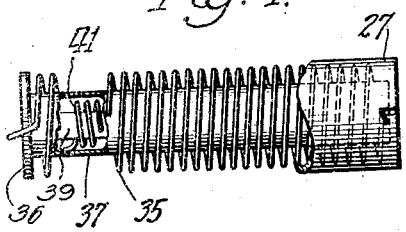
Fig. 4 is a detail of the spring barrel employed in the structure, a portion being broken away for the purpose of illustration.
Figure 5:
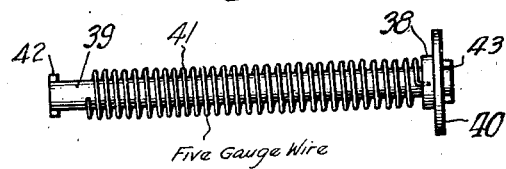
Fig. 5 is a side elevation of the shaft upon which the spring barrel and certain other elements are mounted.

The embodiment of the invention illustrated in the drawings contemplates the use of a casing 10 having the end walls or caps 11 and 12, which together with the casing provide a closure for certain other elements of the structure.

The casing 10 is apertured at 13 and 14 to allow the conductors 15 and 16 to enter and be connected with the brushes 17 and 18, which latter are in electrical connection with the extensible conductor 19, which is wound upon the reel 20. The casing is further provided with an aperture 21 through which an end of the conductor 19 is passed, to the latter of which any desired device 22, such as a lamp socket, cigar lighter, etc., may be attached.

The casing has a bracket 23 secured thereto for the purpose of allowing the attachment of the device to any desirable portion of a vehicle or other structure, and said casing is formed at its opposite ends to produce the recesses 24 and 25 within which the brushes 17 and 18 and other elements of the structure are confined, they being housed and protected by means of the caps 11 and 12 which are associated with the ends of the casing.

The walls of said recesses are apertured at 26 to allow the opposite ends of the spring barrel 27 to be passed therethrough and be supported by the caps 11 and 12. This spring barrel has the reel 20 mounted thereon, and has a portion 28 thereof formed to provide a strap through which the strands of the conductor 19 are passed to allow them to be respectively connected to the collector rings 29 and 30, which are mounted upon the opposite ends of the spring barrel and extend through the aperture 26 so as to permit the brushes 17 and 18 to contact therewith and complete the electrical connection between the conductors 14 and 15 and the extensible cord or conductor 19, which has the strands thereof separate and respectively connected to said rings, as indicated at 31—32. These collector rings are insulated from the spring barrel through the medium of the insulating collars 33—33.

The spring barrel 27 has a plurality of coiled springs arranged therein, which are mounted in series with each other, are wound oppositely to each other, contain a relatively different number of turns or coils and are arranged concentrically and disposed one within the other.

The spring barrel has one end thereof provided with a slot or aperture 34 by which one end of the outermost coiled spring 35 is held. The opposite end of said spring is connected to the flange 36 of a tubular member 37 which is mounted for rotation upon the annular shoulder 38 of a shaft 39, the latter of which is provided with a flange 40 of substantially the same diameter as the flange 36 and provides a support for the adjacent end of the spring barrel 27. A coiled spring 41, which is wound oppositely to the spring 35, is arranged longitudinally of the shaft 39 and has one end thereof connected to the tubular member 36, and has its opposite end fastened to the shaft 39, the latter having its opposite ends provided with the keys 42 and 43, which are inserted into apertures 44—45, provided in the caps or closures 11 and 12, to hold the shaft against rotation.

Figure 6:
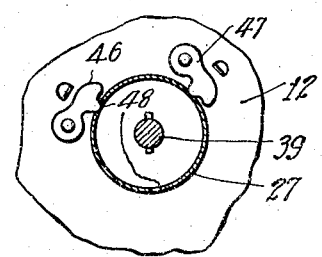
Fig. 6 is a section taken on line 6—6 of Fig. 1, illustrating a means for releasably holding the reel against rotation.

The structure is provided with a means for releasably holding the spring barrel against rotation. This means is clearly shown in Fig. 6, and includes the holding dogs 46 and 47 which are carried by one of the caps, such as 12, and cooperate with apertures 48—48 provided in the end of the spring barrel 27.

As before stated, a spring element such as 41 is arranged within the diameter of another spring as 35, the outer spring containing a relatively larger number of turns or coils than the inner spring 41 and is connected in series with the latter. This arrangement of the springs results in the action of one to be transmitted to the other during the winding and unwinding thereof.

I also preferably employ thinner wire for an inner spring as this gives more winding turns and by using larger wire on the outer spring the tension upon the spool is more even. It is to be understood that I may employ a greater number of springs and in doing so, connect them in series, each spring being wound opposite to its preceding one and preferably gradually increasing the thickness of wire used. That is, each spring is of a heavier wire than the next inner preceding one.

From the foregoing explanation of the structure, and particularly the arrangement and operation of the coiled springs, it is manifest that a relatively longer cord may be employed and its being rewound upon the reel insured.

Having thus described the invention, what I claim and desire to cover by United States Letters Patent is:

1. In a device of the character described, the combination of a reel upon and from which an extension cord is adapted to be wound, and means including a plurality of concentrically arranged longitudinally disposed, oppositely wound spring elements of relatively different tension which cooperate with each other and are operable to cause said cord to be wound upon said reel.

2. A reel comprising a casing, a hollow drum rotatably supported therein upon which a flexible element is arranged to be wound and unwound, a tubular rotatable member extending longitudinally through the hollow drum, a coil spring encircling the tubular member having one end fixed to the drum and its other end anchored, and a second coil spring wound reversely to the first mentioned spring and supported within the tubular member and having one end fixed to the latter and its opposite end anchored, such springs being reversely placed under tension upon unwinding of the flexible element so that upon release of the same both springs will simultaneously act upon the drum to rotate the latter in a direction to rewind the flexible element.

In witness whereof I hereunto subscribe my hand this 28th day of June, 1923.

BERNARD G. JOHNSON.